(12) United States Patent
Chen et al.

(10) Patent No.: US 11,783,359 B2
(45) Date of Patent: Oct. 10, 2023

(54) AUDIO ADVERTISING INTERACTION WITH VOICE INTERACTIVE DEVICES

(71) Applicant: Spotify AB, Stockholm (SE)

(72) Inventors: Edward Yizhi Chen, Astoria, NY (US); Kevin Showkat, Brooklyn, NY (US); Sarah Raymond, Brooklyn, NY (US); Brenton Dale Laverty, Brooklyn, NY (US); Michelle Alexander, Long Island City, NY (US); Lu Han, New York, NY (US); Colette Kolenda, New York, NY (US); Doug DeMarco, Jersey City, NJ (US)

(73) Assignee: Spotify AB, Stockholm (SE)

( * ) Notice: Subject to any disclaimer, the term of this patent is extended or adjusted under 35 U.S.C. 154(b) by 158 days.

(21) Appl. No.: 17/110,186

(22) Filed: Dec. 2, 2020

(65) Prior Publication Data
US 2021/0192575 A1 Jun. 24, 2021

Related U.S. Application Data

(63) Continuation of application No. 16/208,836, filed on Dec. 4, 2018, now Pat. No. 10,878,438.

(60) Provisional application No. 62/594,402, filed on Dec. 4, 2017.

(51) Int. Cl.
| | | |
|---|---|---|
| *G06Q 30/02* | (2023.01) | |
| *G06Q 30/0217* | (2023.01) | |
| *G10L 15/22* | (2006.01) | |
| *G06Q 30/0251* | (2023.01) | |
| *G06F 16/683* | (2019.01) | |
| *G10L 15/26* | (2006.01) | |

(52) U.S. Cl.
CPC ....... *G06Q 30/0217* (2013.01); *G06F 16/683* (2019.01); *G06Q 30/0255* (2013.01); *G06Q 30/0267* (2013.01); *G10L 15/22* (2013.01); *G10L 15/26* (2013.01); *G10L 2015/223* (2013.01); *G10L 2015/225* (2013.01); *G10L 2015/226* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 10,331,401 B2 | 6/2019 | Zhao | |
| 10,509,558 B2 | 12/2019 | Chen | |
| 10,878,438 B2 | 12/2020 | Chen | |
| 10,956,936 B2 | 3/2021 | McLeod | |
| 11,435,892 B2 | 9/2022 | Chen | |
| 2008/0281708 A1* | 11/2008 | Deal ................. | G06Q 30/0273 705/14.69 |
| 2008/0319862 A1 | 12/2008 | Golan | |
| 2009/0030800 A1 | 1/2009 | Grois | |

(Continued)

*Primary Examiner* — Vincent M Cao
(74) *Attorney, Agent, or Firm* — Merchant & Gould P.C.

(57) ABSTRACT

Systems and methods for audio advertising user interaction are disclosed. A voice interactive device causes an advertising audio file to be played for a user. The user can express interest in the advertising content of the advertising audio file by speaking one of a plurality of predetermined intents. Based on expressed user response, one or more results can be provided to the user and/or to a user device. The results relate to advertising content of the advertising audio file.

20 Claims, 7 Drawing Sheets

(56) References Cited

U.S. PATENT DOCUMENTS

| | | | |
|---|---|---|---|
| 2010/0324977 A1* | 12/2010 | Dragt | G06Q 30/02 |
| | | | 705/14.62 |
| 2011/0288913 A1 | 11/2011 | Waylonis | |
| 2012/0109759 A1* | 5/2012 | Oren | G06Q 30/02 |
| | | | 704/260 |
| 2013/0181941 A1 | 7/2013 | Okuno | |
| 2013/0339850 A1 | 12/2013 | Hardi | |
| 2015/0026708 A1 | 1/2015 | Ahmed | |
| 2015/0193516 A1 | 7/2015 | Harb | |
| 2016/0189223 A1 | 6/2016 | McLeod | |
| 2017/0235768 A1* | 8/2017 | Amrutkar | G06F 16/5866 |
| | | | 707/722 |
| 2018/0011686 A1 | 1/2018 | Zhao | |
| 2019/0179506 A1 | 6/2019 | Chen et al. | |
| 2021/0342885 A1 | 11/2021 | McLeod | |
| 2022/0374198 A1 | 11/2022 | Chen | |

\* cited by examiner

FIG. 7

AUDIO ADVERTISING INTERACTION WITH VOICE INTERACTIVE DEVICES

CROSS-REFERENCE TO RELATED APPLICATION(S)

This application is a Continuation of U.S. application Ser. No. 16/208,836, filed on Dec. 4, 2018, which claims priority to U.S. Application No. 62/594,402, filed on Dec. 4, 2017, which are titled AUDIO ADVERTISING INTERACTION WITH VOICE INTERACTIVE DEVICES, the disclosures of which are hereby incorporated by reference in their entireties.

BACKGROUND

Voice interactive devices typically include components configured to receive, process, and perform actions based on voice commands. Some voice interactive devices use specialty hardware and/or software platforms to understand and provide context for communications with a human user. Commonly, voice interactive devices are used in living spaces. Voice interactive devices provide another access point for presenting advertisements to users.

SUMMARY

Techniques and apparatus disclosed herein relate to audio advertising user interaction. Users interact with audio advertising via voice interactive devices. One or more results can be provided to users, typically on a user-associated device or user-associated account, based on received user interest.

In one aspect, a method for determining advertising interaction with an electronic device is disclosed. The method can include transmitting an advertising audio file to an electronic device receiver application, the advertising audio file including advertising content, receiving user response input, processing the user response input to determine a user response to the advertising audio file, and providing a result to the user, the result being related to the user response to the advertising audio file. The user response input includes one of a plurality of predetermined communications and the user response input is generated based on input spoken during playback of the advertising audio file.

In another aspect, a method for user interaction relating to audio advertising on a voice interactive device is disclosed. The method can include receiving an advertising audio file request, transmitting an advertising audio file, the advertising audio file including content advertising a subject, receiving user response input, processing the user response input, and based on the user response, providing a result to a device associated with the user, the result being related to the user response to the advertising audio file. The user response input includes one of a plurality of predetermined intents, where the predetermined intents relate only to audio file playback functionalities. The user response input is also generated based on input spoken during playback of the advertising audio file. Processing the user response input includes determining whether the user response input corresponds to an advertising audio file and determining a user response to the advertising audio file.

In another aspect, a system for audio advertising user interaction is disclosed. The system includes a media streaming application stored in memory of a voice interactive device and a media server in communication with the media streaming application. The media server includes a processing unit and memory storing instructions that, when executed by the processing unit, causes the media server to: transmit an advertising audio file to an electronic device receiver application, the advertising audio file including advertising content; receive user response input; process the user response input to determine a user response to the advertising audio file; and provide a result to the user, the result being related to the user response to the advertising audio file. The user response input includes one of a plurality of predetermined intents, where the predetermined intents relate only to audio file playback functionality. The user response input is generated based on input spoken during playback of the advertising audio file.

The details of one or more embodiments are set forth in the accompanying drawings and the description below. It is to be understood that both the foregoing summary of the disclosure and the following detailed description are exemplary and intended to provide further explanation without limiting the scope of the disclosure.

BRIEF DESCRIPTION OF THE DRAWINGS

The following figures, which form a part of this application, are illustrative of described technology and are not meant to limit the scope of the claims in any manner.

DETAILED DESCRIPTION

Various embodiments of the present invention will be described in detail with reference to the drawings, wherein like reference numerals represent like parts and assemblies throughout the several views. The features described herein are examples of implementations of certain broad, inventive aspects, which underlie the disclosure.

Broadly, systems and methods disclosed and contemplated herein relate to audio advertising user interaction. More specifically, systems and methods disclosed and contemplated herein relate to advertisements presented by voice interactive devices. As used herein, the terms "advertising" and "advertisements" include advertisements and/or sponsored content.

Generally, audio advertising is ephemeral. Short time periods and the audial medium limit the amount of information that can be conveyed in an audio advertisement. An audio advertisement listener might be interested in an advertisement but the listener may later forget to follow up. When an audio advertisement is played, an audio advertisement listener might not be able to access a device enabling them to interact with a subject of the advertisement. An audio advertisement listener might want to follow up regarding the advertisement at a later time.

Some voice interactive devices allow third party software to be installed or hosted thereon. Typically, however, third party software does not have access to all capabilities of the voice interactive device. For instance, an application programming interface (API) of the voice interactive device may limit the device's functionalities accessible by the third party software and/or types of data the third party software has access to.

Advertising is a revenue source for voice interactive device manufacturers. Through typical usage, voice interactive devices can acquire data regarding a particular user's daily life, habits, likes and dislikes, etc. These data can be used to present more targeted advertisements to the user, either via the voice interactive device or through other devices related to the user. Accordingly, advertisements presented through voice interactive devices are potentially valuable revenue streams. Some voice interactive device manufactures limit, partially or in full, third party software capability to present voice advertisements to users.

Figure 1:
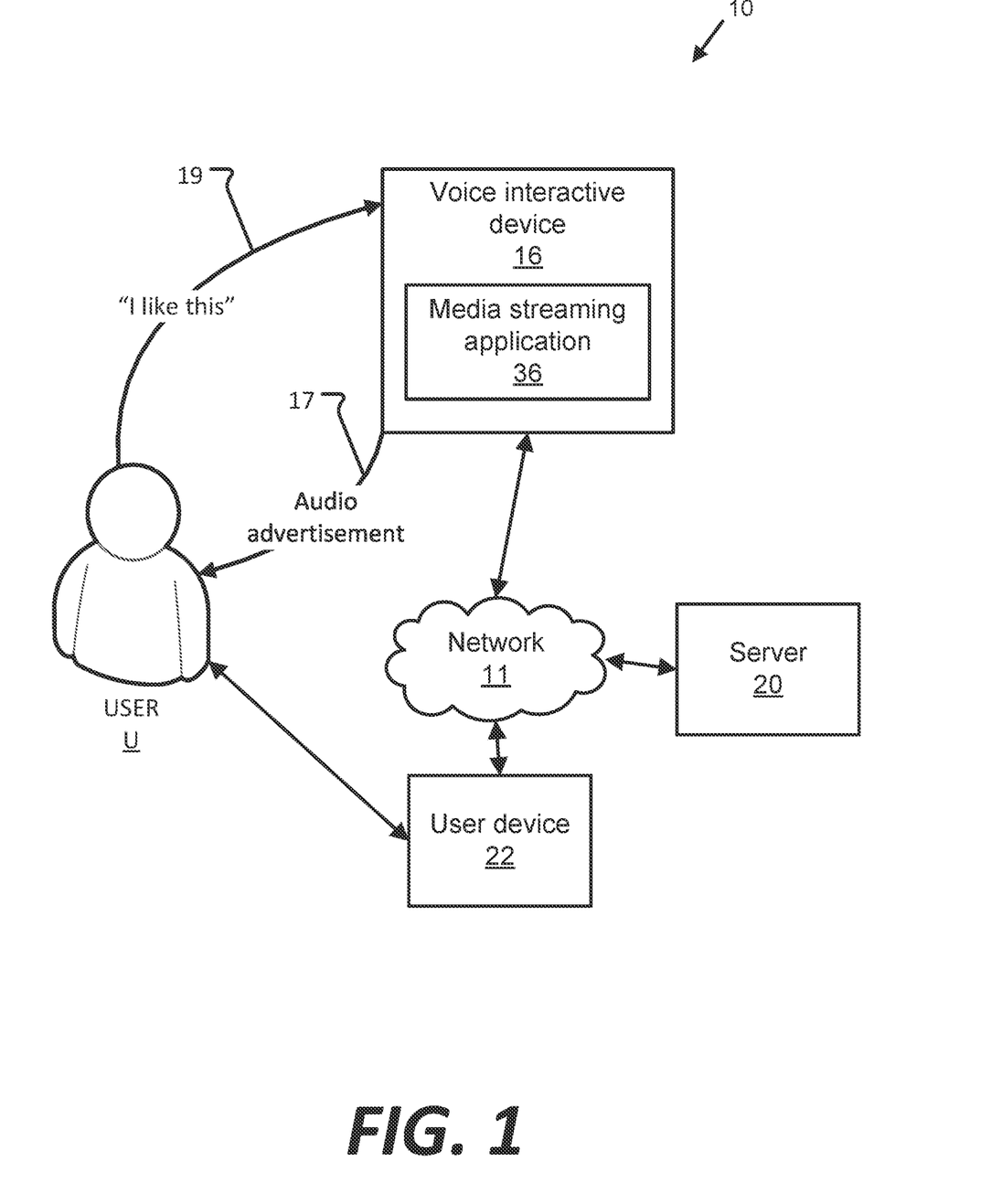
FIG. 1 is a schematic diagram of an example media content environment.

FIG. 1 is a schematic block diagram of example media content environment 10. Environment 10 includes voice interactive device 16, server 20, and user device 22. Voice interactive device 16 is in communication with server 20 via network 11. Server 20 is in communication with user device 22 via network 11. User U interacts with voice interactive device 16. Concurrent with, or subsequent to, interacting with voice interactive device 16, user U also has access to user device 22. Other embodiments can include more or fewer components.

Media content environment 10 provides capability for user U to interact with voice interactive device 16. Common interactive activities include presenting queries to voice interactive device 16, receiving answers from the voice interactive device 16, and playing various media for user U. Media content environment 10 can be implemented in personal living space, such as an apartment or home, at a place of business, and/or a mobile environment, such as a car or bus.

Voice interactive device 16 receives and processes various communications from user U to accomplish various functionalities. Example functionalities include setting reminders, creating lists, playing audio content, performing research, and the like. Some or all of these communications can be transmitted for processing and/or storage with server 20 via network 11. Broadly, voice interactive device 16 includes components configured to receive vocal communications from user U, such as microphone units. Voice interactive device 16 also typically includes a speaker or is capable of communicating audio signals to external speakers.

In some implementations, voice interactive device 16 includes virtual digital assistant software, such as Amazon Alexa, Google Assistant, Microsoft Cortana, and Apple Siri. Example commercial embodiments of voice interactive device 16 include the Google Home by Google (Mountain View, Calif.) and the Amazon Echo by Amazon (Seattle, Wash.).

Voice interactive device 16 includes memory-storing media streaming application 36. Typically, media-streaming application 36 is a third party application, however, in alternate implementations, media streaming application 36 is a first party application. Generally, media-streaming application 36 provides functionality to voice interactive device 16 and typically communicates with one or more servers via network 11.

Hardware and/or software platforms manage operation of voice interactive device 16. The software platform includes an application programming interface (API) stored locally or remotely. The API includes instructions for how various third party software applications, such as media streaming application 36, can leverage various functionalities provided by voice interactive device 16. In addition, the API can limit the functionalities accessible by third party application.

For example, the API can define a fixed number of "intents". Generally, intents are an enumerated list of spoken commands or predetermined communications that can trigger predefined actions. The intents can be generic or specific to the type of actions performed by third party media-streaming application 36. Intents are different from wake words, where a wake word is a word or phrase that prompts voice interactive device 16 to take action. Example wake words include "Hey Google," "Alexa," "Computer," and the like. In a media streaming context, the intents may be limited to commands related to media playback. Example media streaming intents include: play, skip, pause, stop, shuffle, repeat, and I like this.

Typically, when voice interactive device 16 receives communication from user U, voice interactive device 16, or a server in communication with voice interactive device 16, performs a first cut parsing of the communication. Generally, the first cut processing includes converting the voice to text, analyzing the text, and determining whether the user communication relates to action that is performed by voice interactive device 16. If it is determined that the user communication relates to functionality provided by a third party application, the third party application is determined and then voice interactive device 16 and/or server 20 communicates the intent, likely with other identifying data, to a third party application server. Then one or more third party application servers can parse the communication including the intent.

In an embodiment, the API defines intents that only relate to audio content streaming. No intents are specific to advertisement interaction. The voice interactive device 16 and/or server 20, upon receiving the intent, determines that the intent relates to media streaming application 36 and communicates the intent, potentially with other data, to a server related to media streaming application 36. In turn, servers associated with media streaming application 36 can receive and process the audio content streaming intents as one or more types of advertisement interaction.

In some embodiments, voice interactive device 16 does not include a display screen. Alternatively, in some embodiments, voice interactive device 16 includes a display screen that can be touch sensitive. Voice interactive device 16 can be, for example, a personal computer system, handheld entertainment device, tablet device, smartphone, television, audio speaker, in-car entertainment system, or other type of electronic or media device that is adapted or able to prepare media content for presentation, control the presentation of media content, and/or play or otherwise present media content.

FIG. 1 also shows an example interaction between user U and voice interactive device 16. Voice interactive device 16 plays audio advertisement 17 for user U. User U can ignore the advertisement or provide some type of user response input. In the example shown, the user response input is "I like this," where "I like this" is an intent related to music playback. Additional example interactions are provided below with reference to, at least, FIGS. 2-7.

Network 11 is typically any type of wireless network or other communication network known in the art. Examples of network 11 include the Internet, an intranet, a wide area network (WAN), a local area network (LAN), and a virtual private network (VPN), cellular network connections and connections made using protocols such as 802.11a, b, g, n and/or ac.

Server 20 receives and processes communications from voice interactive device 16. Server 20 can also communicate with user device 22, where those communications typically relate to communications from user U indicating interest in advertising. Server 20 includes, or has access to, one or more databases.

In some instances, server 20 includes multiple server devices. The multiple server devices can be owned, managed, and/or controlled by separate entities. Various actions performed by one or more servers can include analyzing user communications, performing party-specific actions, accessing and/or transmitting media content, and the like. As an example, a first server is specific to voice interactive device 16 manufacturer and receives and processes communications from user U. That first server can determine whether certain communications relate to third party software and can transmit those communications to a second server that is specific to the third party software.

User device 22 receives communications relating to user U's interaction with voice interactive device 16. User device 22 is a computing device associated with user U. Examples of user device 22 include mobile phones, smart phones, tablet computing devices, desktop computing devices, smart watches, and the like. During user U interaction with voice interactive device 16, user device 22 may or may not be accessible to user U.

Figure 2:
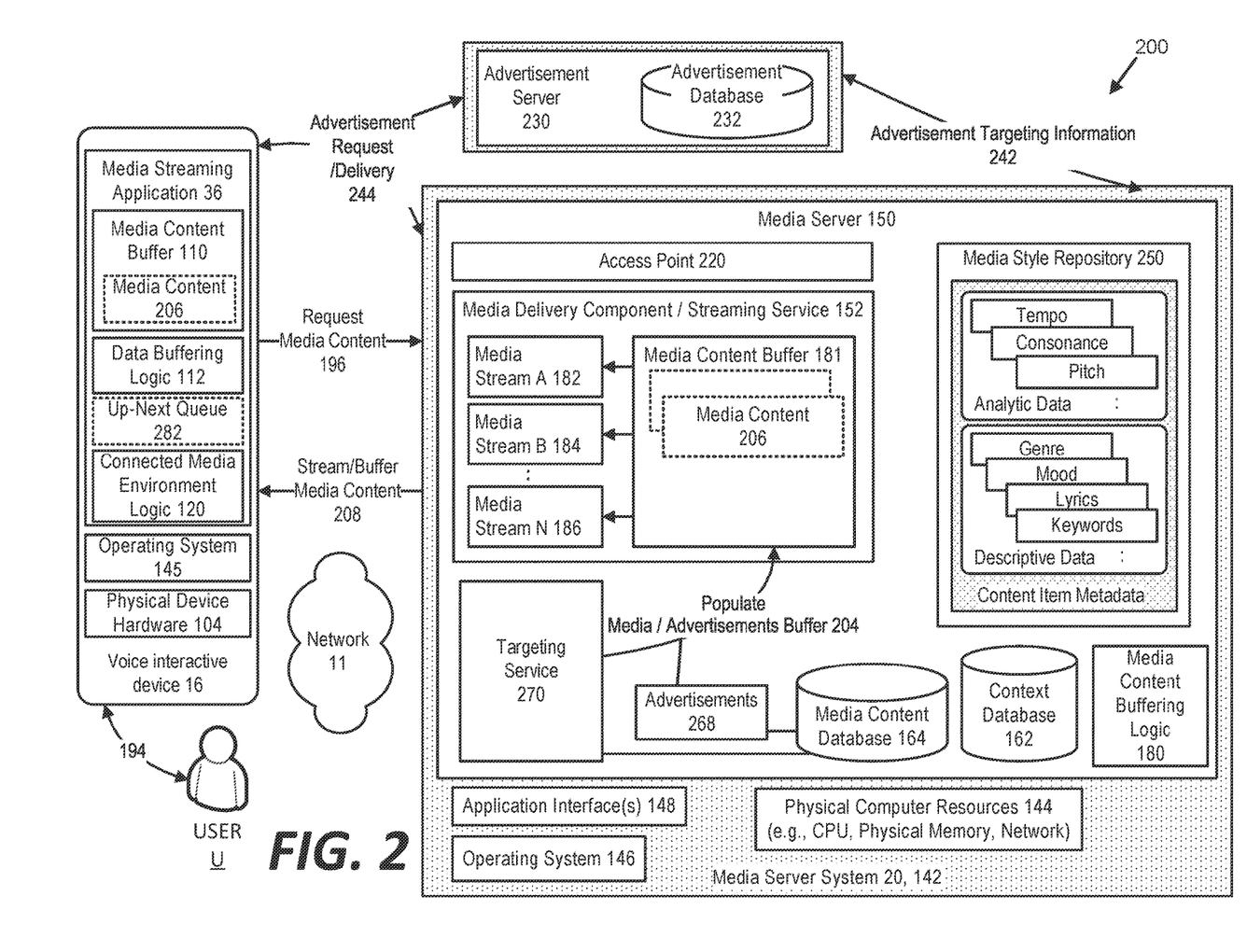
FIG. 2 is a schematic diagram showing additional details of certain components of the environment shown in FIG. 1.

FIG. 2 is a schematic block diagram of example digital media content environment 200 to provide advertisements. User U can interact with voice interactive device 16. Voice interactive device 16 can issue requests to access media content at a media server, for example, to stream music, video, or other forms of media content to voice interactive device 16. In response, the media server can populate a media content buffer with corresponding items of media or sponsor-directed content, for example as one or more streams of media content and/or advertisement or other sponsor-directed content. The media server can also communicate the selected media content to voice interactive device 16.

Voice interactive device 16, operating as a client device, receives and plays media content provided by media server system 20, 142, or by another system or peer device. In the embodiment shown, media server system 142 is one of the servers 20 shown in FIG. 1. Additionally, media server system 142 handles requests for media received from media streaming application 36.

Voice interactive device 16 and the media server can include, respectively, one or more physical device or computer hardware resources 104, 144, such as one or more processors (CPU), physical memory, network components, or other types of hardware resources. Voice interactive device 16 and the media server include, respectively, an operating system 145, 146 or other processing environment.

Although for purposes of illustration a single voice interactive device 16 and media server are shown, media server system 142 can support simultaneous use of a plurality of voice interactive devices 16. Similarly, client voice interactive device 16 can access media content provided by a plurality of media servers, or switch between different media streams provided by one or more media servers.

Voice interactive device 16 can optionally interact with, or cast to, a touch-enabled or other type of display screen having a user interface. Example display devices include smart phones, tablet computing devices, and televisions. The user interface is adapted to display media options, for example as an array of media tiles, thumbnails, or other format, and can determine a user interaction or input. Selecting a particular media option, for example a particular media tile or thumbnail, can be used as a command by a user and/or the media device, to the media server, to download, stream or otherwise access a corresponding particular media content item or stream of media content.

Voice interactive device 16 also includes software media streaming application 36, together with an in-memory client-side media content buffer 110, and a client-side data buffering logic or software component 112, which can be provided as software or program code that is executable by a computer system or other processing device, and which can be used to control the playback of media content received from the media server, for playing either at a requesting voice interactive device 16 (i.e., controlling device) or at a controlled voice interactive device 16 (i.e., controlled device), in the manner of a remote control.

A connected media environment logic or software component 120, which can be provided as software or program code that is executable by a computer system or other processing device, can be provided at the voice interactive device 16, either as part of the media streaming application, or separately, for example as a firmware, to enable voice interactive device 16 to participate within a connected media environment (e.g., a Spotify Connect environment) that enables a user to control the playback of media content at such controlled devices.

The client-side data buffering logic, together with the media content buffer, enables a portion of media content items, or samples thereof, to be pre-buffered at voice interactive device 16. For example, while media options are being prepared for play on a user interface, e.g., as media tiles or thumbnails, their related media content can be pre-buffered at the same time, and cached by one or more voice interactive devices 16 in their media content buffers, for prompt and efficient playback when required.

Media server system 142 can include an operating system or other processing environment, which supports execution of a media server 150 that can be used, for example, to stream music or other forms of media content to voice interactive device 16, or to a controlled device.

Media server can provide a subscription-based media streaming service, for which voice interactive device 16 or user can have an associated account and credentials, and which enable the user's voice interactive device 16 to communicate with and receive content from the media server A received media-access request from voice interactive device 16 can include information such as, for example, a network address, which identifies a destination voice interactive device 16 to which the media server should stream or otherwise provide media content, in response to processing the media-access request.

For example, a user may own several media devices, such as a smartphone and an audio speaker, which can play media content received from a media server. Identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

One or more application interface(s) 148 can receive requests from voice interactive devices 16, or from other systems, to retrieve media content from the media server. A context database 162 can store data associated with the presentation of media content by a voice interactive device 16, including, for example, a current position within a media stream that is being presented by voice interactive device 16, or a playlist associated with the media stream, or one or more previously-indicated user playback preferences.

The media server can transmit context information associated with a media stream to voice interactive device 16 that is presenting that stream, so that the context information can be used by the device, and/or displayed to the user. The context database can be used to store voice interactive device's 16 current media state at the media server, and synchronize that state between devices, in a cloud-like manner. Alternatively, media state can be shared in a peer-to-peer manner, wherein each device is aware of its own current media state, which is then synchronized with other devices as needed.

For example, when the destination voice interactive device 16 to which the media content is being streamed changes, say from a controlling device to a controlled device, or from a first controlled device to a second controlled device, then the media server can transmit context information associated with an active media content to the newly-appointed destination device, for use by that device in playing the media content.

Media content database 164 can include media content, for example music, songs, videos, movies, or other media content, together with metadata describing that media content. The metadata can be used to enable users and voice interactive device 16 to search within repositories of media content, to locate particular media content items.

A server-side media content buffering logic or software component 180, which can be provided as software or program code that is executable by a computer system or other processing device, can be used to retrieve or otherwise access media content items, in response to requests from voice interactive device 16 or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

A plurality of voice interactive device 16, media server systems, and/or controlled devices, can communicate with one another using network 11, for example the Internet, a local area network, peer-to-peer connection, wireless or cellular network, or other form of network. For example, a user 192 can interact 194 with the user interface at voice interactive device 16, and issue requests to access media content, for example the playing of a selected music or video item at their device, or at a controlled device, or the streaming of a media channel or video stream to their device, or to a controlled device.

User U's selection of a particular media option can be communicated 196 to the media server, via the server's application interface. The media server can populate its server-side media content buffer at the server 204, with corresponding media content, 206 including one or more streams of media content data, and can then communicate 208 the selected media content to the user's voice interactive device 16, or to a controlled device as appropriate, where it can be buffered in a client-side media content buffer for playing at the device.

As further described below, the system can include a server-side media gateway or access point 220, provided as software or program code that is executable by a computer system or other processing device, or other process or component, which operates as a load balancer in providing access to one or more servers, for use in processing requests at those servers. The system can enable communication between voice interactive device 16 and a server, via an access point at the server, and optionally the use of one or more routers, to allow requests from voice interactive device 16 to be processed either at that server and/or at other servers.

For example, in a Spotify media content environment, Spotify clients operating on voice interactive device 16 can connect to various Spotify back-end processes via a Spotify "accesspoint", which forwards client requests to other servers, such as sending one or more metadataproxy requests to one of several metadataproxy machines, on behalf of the client or end user.

Targeting service 270 can be used to determine an appropriate sponsored content or advertisement, which can be combined or otherwise associated with a particular stream or session of media content playback.

For example, the media server can include a media style repository 250 that stores media content item metadata associated with different items of media content, for use in providing music-styled and/or contextual information about the media content. The media delivery component/streaming service, in combination with the targeting service, can determine an appropriate media content, and/or sponsored content or advertisement 268, for streaming within a particular session, for example as a playlist having a plurality of tracks.

Media streaming application 36 can operate with the media server to maintain a queue data structure, referred to herein as an up-next queue 282, which indicates one or more items of media content as determined by a current playlist, and/or by sponsored content or advertisements, that are scheduled to be played at voice interactive device 16.

Alternatively and/or additionally, an advertisement server 230, for example a DoubleClick for Publishers (DFP) advertisement server, together with an advertisement database 232, can be used in connection with the media server to help manage a content provider's advertising campaigns and satisfy orders from advertising partners.

Advertising targeting information 242 can be shared between the media server and the advertisement server, for use in determining an audio advertisement or other type of advertisement to be inserted into a stream, for playback at voice interactive device 16.

For example, during the playing of media content associated with a playlist, an advertisement, as determined by the media server or advertisement server, can be inserted into either the playlist, and/or the up-next queue, for playback by media streaming application 36 at the voice interactive device 16.

Media streaming application 36 can make a call 244 either to the advertisement server, or to the media server, requesting that an audio advertisement or other type of advertisement be directly provided by the advertisement server or media server, to voice interactive device 16, for playback at voice interactive device 16. In such environments, the advertisement server or media server can then make a determination as to which particular advertisement to deliver.

Alternatively, in accordance with an embodiment, a code/tag can be used to retrieve a particular audio advertisement or other type of advertisement either from the media server, or from the advertisement server.

For example, in accordance with an embodiment, the advertisement server can be used to determine which advertisement should be provided, and use redirection, in combination with a code/tag, to cause the client to retrieve the appropriate content from the media server, for example by providing the code/tag to the client, which the client can then use to request the corresponding content from the media server.

In such embodiments, the advertisement server can be responsible for selecting or determining an advertisement, with the media server being responsible for receiving the requests from the clients and delivering the advertisement to voice interactive device 16. The above examples are provided by way of illustration. In accordance with other embodiments, other methods of determining and providing advertisements can be used.

Figure 3:
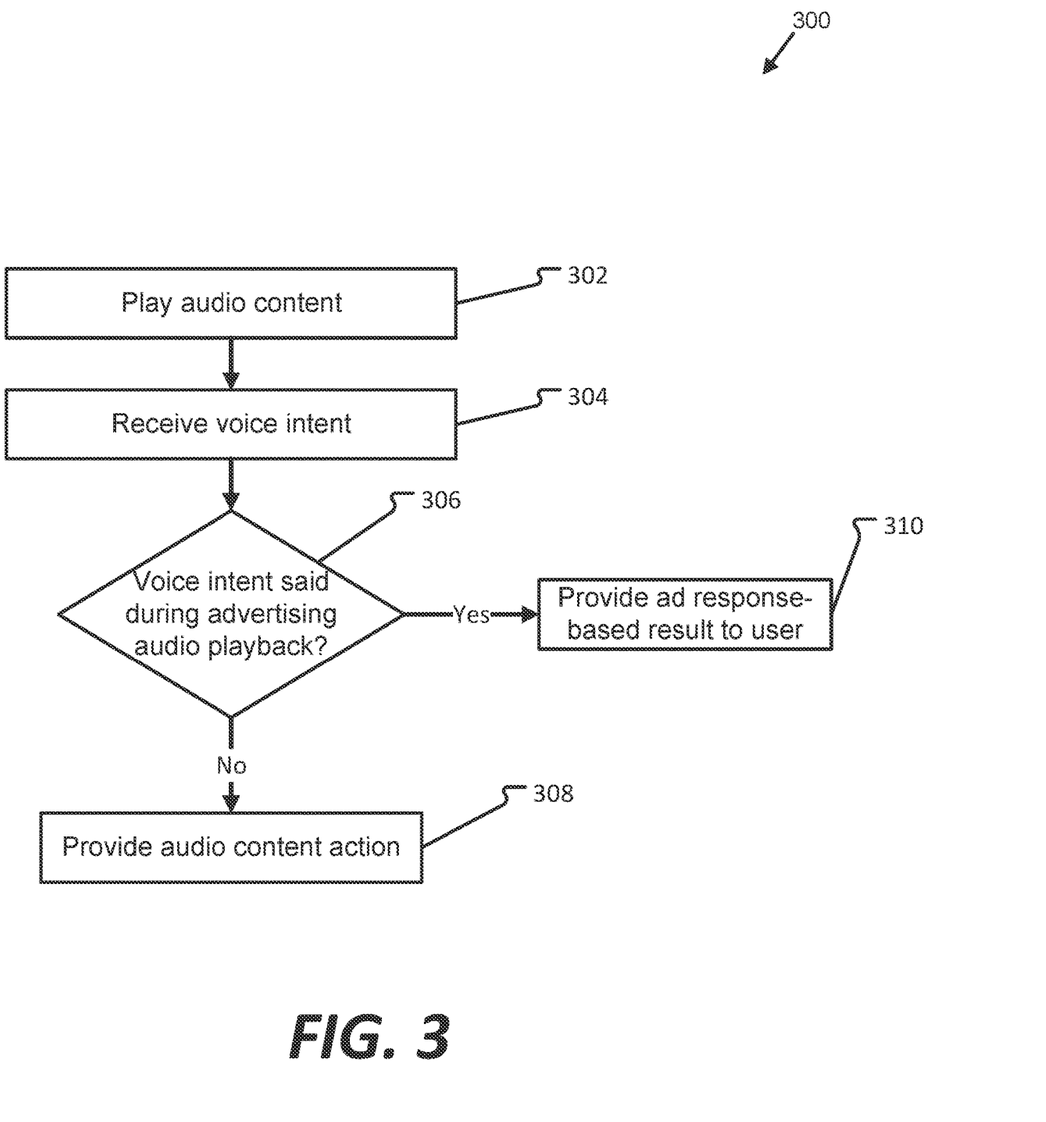
FIG. 3 shows an example method for repurposing existing voice intents for advertisement.

FIG. 3 shows an example method 300 for repurposing existing voice intents for advertisement. The example method 300 includes playing audio content (operation 302), receiving voice intent (operation 304), determining if the voice intent is said during advertising audio playback (operation 306), providing audio content action (operation 308), and providing advertisement response-based result to user (operation 310). Components in example media content environment 10 can be used to perform one or more operations of example method 300. Other embodiments can include more or fewer operations.

The example method 300 begins by playing audio content (operation 302) for a user. A voice interactive device plays the audio content through one or more speakers that can be part of the voice interactive device or that are in communication with the voice interactive device. In one embodiment, and as discussed below at least with reference to FIG. 5, audio content files transmitted to the voice interactive device are coded such that the voice interactive device cannot discern which files are advertisements. Example audio content includes non-advertising audio files, such as music, news, podcasts, and advertisements/advertising audio files.

In some instances, advertising audio files include an advertising portion and a user response prompt. In some implementations, the advertising portion is a separate audio file from the user response prompt. The user response prompt typically includes an intent that the user should speak if they are interested in the advertisement content.

During playback of audio content, a voice intent is received (operation 304). In operation 304, a microphone unit of the voice interactive device receives a spoken voice intent. As discussed in greater detail above, one or more processing operations are typically performed to decode and interpret the spoken words to determine whether the words correspond to a known or existing intent. Typically, the voice intent is preceded by a wake word. The voice interactive device and/or a server associated with the voice interactive device can transmit the voice intent to a remote server for processing.

Upon receiving the voice intent, a determination (operation 306) is made whether the voice intent was said during an advertisement. Determining whether the voice intent was said during an advertisement (operation 306) can be performed in various ways. For example, operation 306 can include comparing a time stamp on the intent with audio file queues including audio advertisement files. As another example, operation 306 can include analyzing the intent transmission received from the voice interactive device to recognize identifying data or metadata indicating that an advertisement was playing during the voice intent.

If the voice intent was not said during advertising audio playback, then audio content action is provided (operation 308). Operation 308 can include parsing the intent to determine action corresponding to the intent. For example, if the intent includes "next", then the audio content action includes causing the next audio file in the queue to be played.

If the voice intent was said during advertising audio playback, then one or more advertisement response-based results are provided to the user (operation 310). Operation 310 can include parsing the intent to interpret the user's signal. During operation 310, the intent can be redirected from an audio content response to an advertising response. Advertising responses can include various results, such as delivering a message to a device associated with the user and sending an email to an account associated with the user. Thereby, in one example, after the user signals interest in the advertisement via the voice intent, the user can access another device and receive more information regarding the advertisement.

Figure 4:
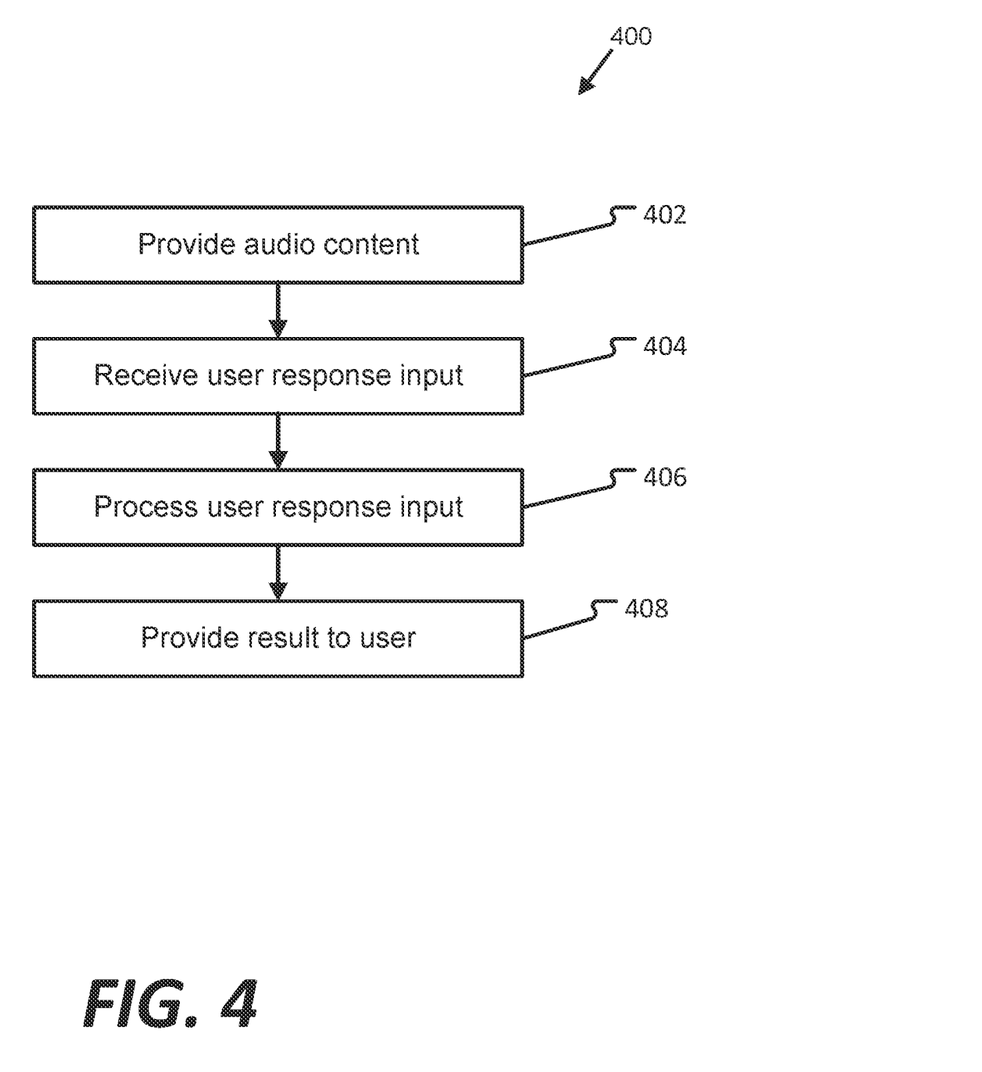
FIG. 4 shows an example method for advertising interaction on a voice interactive device.

FIG. 4 shows an example method 400 for advertising interaction on a voice interactive device. The example method 400 includes providing audio content (operation 402), receiving user response input (operation 404), processing user response input (operation 406), and providing a result to the user (operation 408). One or more components of example environment 10 or 200 can perform one or more operations of example method 400. In some instances, media streaming application 36 and/or server 20, which can be third party relative to the first party of voice interactive device 16, perform all operations of example method 400. Other embodiments can include more or fewer components.

Example method 400 begins by providing audio content (operation 402). Providing audio content (operation 402) can be in response to receiving an audio content request. Audio content can include one or more media files and/or a queue of media files. Audio content includes advertising audio files and non-advertising files (e.g., music, news, podcast, etc.). Typically, audio content is transmitted from a server system to an application stored locally on a voice interactive device. In most instances, playback of advertising audio files is preceded and followed by playback of non-advertising audio files.

Figure 5:
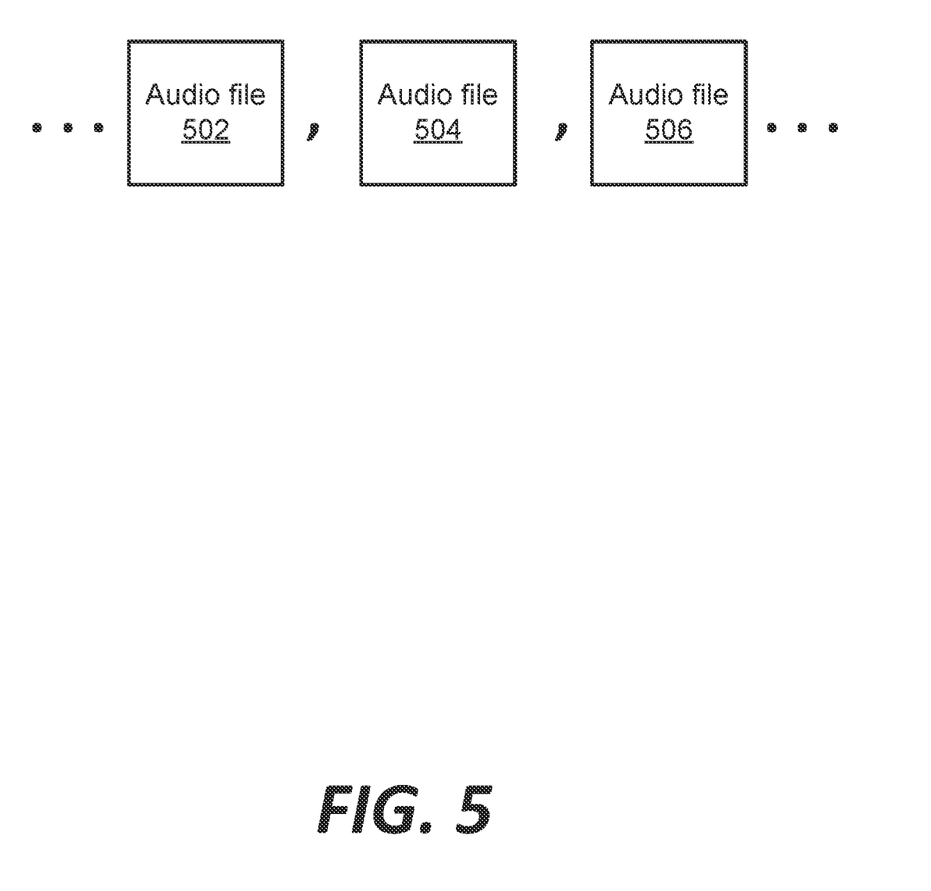
FIG. 5 is a schematic depiction of audio files in a queue, the audio files including advertising audio and non-advertising audio.

Referring for the moment to FIG. 5, providing audio content (operation 402) can include transmitting one or more audio files, shown schematically in FIG. 5. In various implementations, audio files can be transmitted to voice interactive device separately or along with one or more audio files. Audio files 502, 504, 506 can be transmitted with, or as part of, a queue or a list providing playback order.

Each audio file 502, 504, 506 has a unique identifier or file name. In an embodiment, the identifier of each audio file 502, 504, 506 is anonymized so that another entity, such as the entity associated with the voice interactive device, cannot discern which audio file is a song (or other non-advertisement media) and which audio file is an advertisement.

Referring again to FIG. 4, after providing audio content (operation 402), user response input is received (operation 404). User response input typically includes an intent spoken by the user. The message or transmission including the intent can additionally include other identifying data. Identifying data includes, for example, user account data, user mobile phone data, and/or audio file data. The message or transmission including the intent can additionally include data about which audio file was playing when the intent was received by the voice interactive device.

Receiving user response input (operation 404) can include receiving transmissions from the voice interactive device and/or a server associated with the voice interactive device. Typically, a media streaming application stored locally on the voice interactive device receives the transmission and, in turn, transmits the user response input to a media server.

Next, the user response input is processed (operation 406). Processing the user response input (operation 406) usually includes logging the intent included in the user response input transmission. Usually, processing the user response input (operation 406) next includes categorizing the intent as relating to an advertisement or to non-advertising audio. Based on that categorization, processing the user response input (operation 406) includes determining an action corresponding to the intent. Actions based on the intent vary depending on whether the intent was received during playback of an advertising audio file or a non-advertising audio file.

For example, processing an intent of "next" received during playback of a non-advertising audio file yields a determination that the user requests playing the next song. Based on that determination, one or more transmissions are sent to the media streaming application.

Processing an intent received during playback of an advertising audio file includes one or more determinations. For instance, during processing user response input (operation 406), the system can determine: which advertisement was playing during the spoken intent, which account or user corresponds to the intent, what follow-up result to send to the user, and/or identifying one or more user devices or email accounts to transmit the follow-up result to.

As used herein, a "result" is a message, transmission, or set of communications to a user relating to an advertising audio file played for the user. A result can be transmitted to multiple user devices, such as a mobile phone and a tablet computing device, and/or to multiple user accounts, such as email accounts. A result can be a display or overlay on a device. For example, a result can appear on a user device lock screen and/or when a user opens or logs into an application corresponding to the media streaming application.

Generally, results provide information about a subject of the advertising audio file. Results can be reminders, such as "Remember to visit Honda.com to see the new Civic." Results can include additional information or hyperlinks to additional information, such as providing details about an advertised product that were not included in the advertisement. Results can be coupons or hyperlinks to coupons, such as a 50% discount on tickets to an advertised concert, or a free taco from the restaurant advertised. Coupons can be presented as codes, such as bar codes and/or QR codes.

In some instances, results include confirmation to the user. For example, after a user signals interest in an advertisement, the system can transmit an audio file confirming receipt of the user intent.

After processing user response input (operation 406), a result is provided to the user (operation 408). Providing the result to the user (operation 408) can include transmitting messages to one or more user devices or accounts. As discussed above, these messages relate to the advertisement that the user expressed interest in. Providing the result to the user (operation 408) can also include transmitting a confirmation audio file to be played by the voice interactive device. After providing the result (operation 408), one or more additional non-advertising media files can be transmitted for playback by the voice interactive device.

Figure 6:
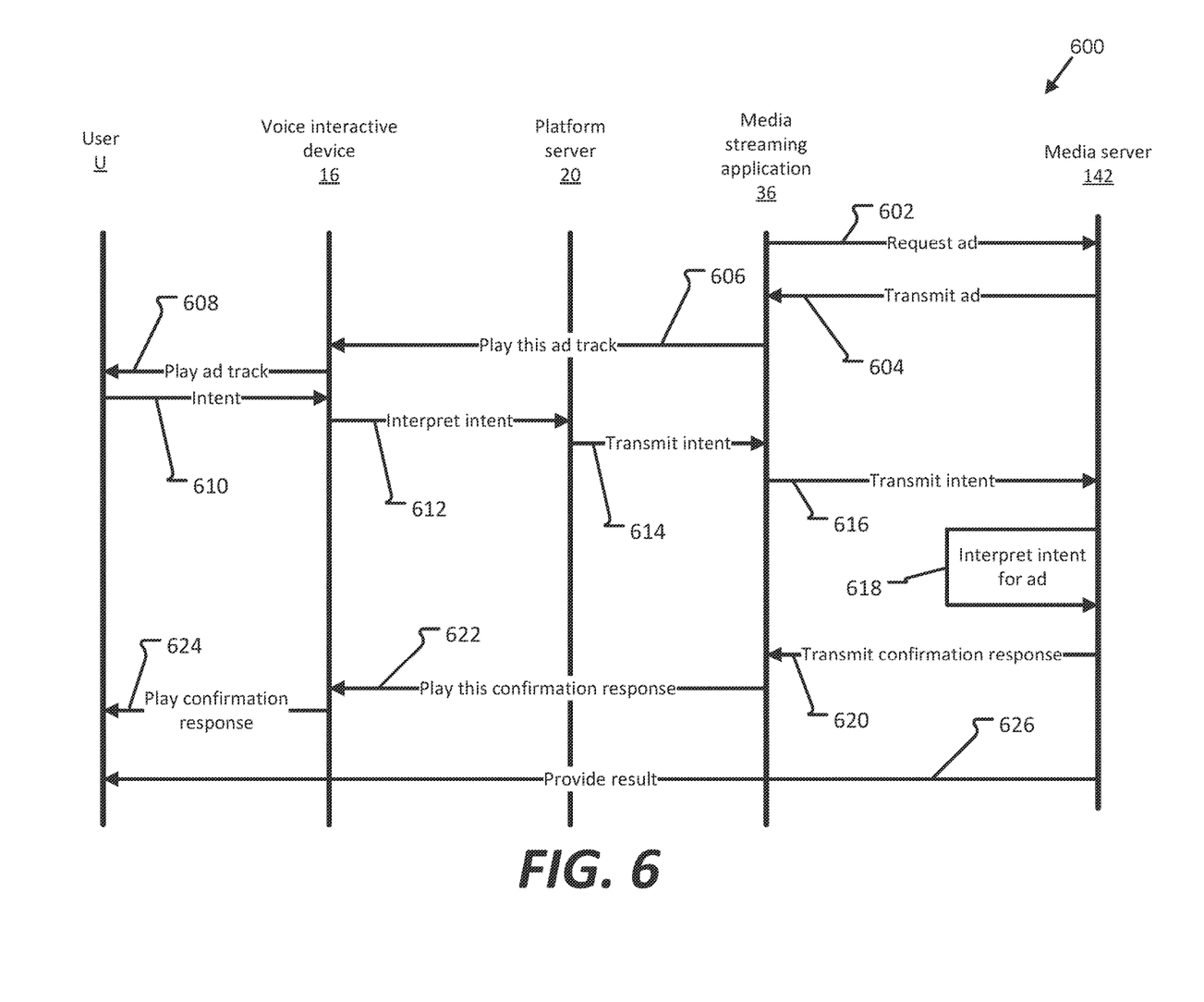
FIG. 6 is a messaging schematic for user advertising interaction.

FIG. 6 is a messaging schematic 600 for user advertising interaction. FIG. 6 shows example transmissions between components of digital media content environment 200, including media server 142, media streaming application 36, platform server 20, voice interactive device 16, and user U. Implementations of methods and techniques disclosed and contemplated herein can include additional steps, information, and transmissions from what is shown in FIG. 6.

Schematic 600 begins with media streaming application 36, stored locally on voice interactive device 16, requesting advertising audio files 602. Typically, voice interactive device 16 has played one or more non-advertising audio files when request 602 is transmitted. Media server 142 receives and processes the request, which can also include querying one or more advertising servers or services. Then, media server 142 transmits 604 one or more advertising audio files to media streaming application 36. Transmission 604 can include a queue and/or non-advertising audio files to be played after the advertising audio file.

Media streaming application 36 then causes 606 voice interactive device 16 to play the advertising audio file. Playing the advertising audio file 606 can be implemented as a transmitted request to voice interactive device 16 software. Then voice interactive device 16 plays the advertising audio file 608 for the user. Playing the advertising audio file 608 can be via voice interactive device 16 speakers or speakers in communication with voice interactive device 16. Advertisement playback 608 can include the actual advertisement and a request for user U response with an existing playback intent.

As an example advertisement playback 608, an audio advertisement for the Samsung Galaxy S8 plays. Continuing with the example, the advertising audio can also include "Hey Spotify listener, want more information about the Samsung Galaxy S8? Just say, 'OK Google, I like this.'"

During advertisement audio playback 608, user U can indicate interest by speaking an intent 610. The intent is received by voice interactive device 16 and is usually preceded by a wake word. For example, user U might say "Okay Google, I like this."

Voice interactive device 16 will not take action unless it first receives the wake word. This includes transmitting audio received by voice interactive device 16, such that voice interactive device 16 is not continuously monitoring and transmitting data recorded from the environment. Additionally, typically, there are one or more privacy policies controlling the use of user data, including personally-identifying data and data recorded by voice interactive device microphones. Usually, users agree to the privacy policy before interaction with voice interactive device 16.

After receiving the intent, voice interactive device 16 transmits the intent with a request to interpret the intent 612. Typically, request 612 is sent to a platform server 20. Platform server 20 interprets the intent, which can include determining whether the intent should be passed on to an application for action. Transmission 612 can include, for example, a request to translate "I like this."

If the intent does not correspond to a voice interactive device-specific action, typically server 20 transmits the intent 614 to media streaming application 36. Intent transmission 614 can include the intent, a translation of the intent, and/or other data. Media streaming application 36 can append additional data, such as user data, audio file data, etc., and transmit the intent 616 to media server 142. Intent transmission 616 can include a request to perform an action based on the intent.

Media server 142 processes and interprets the intent 618, which can include some or all of the processes described above. Processing intent 618 can include reinterpreting a playback intent (an intent designed for media playback and not advertising interaction) for advertising. Media server 142 can provide a result 626 to user U via one or more user devices or accounts.

In some instances, media server 142 transmits a confirmation response 620 to media streaming application 36. As discussed above, confirmation response is an audio confirmation that the system received the user's intent regarding the advertisement. An example confirmation response is "Great! More information is on the way." Media streaming application 36 transmits 622 a request to play the confirmation response to voice interactive device 16. After voice interactive device 16 plays the confirmation response 624, music or other non-advertising audio playback then typically resumes.

Figure 7:
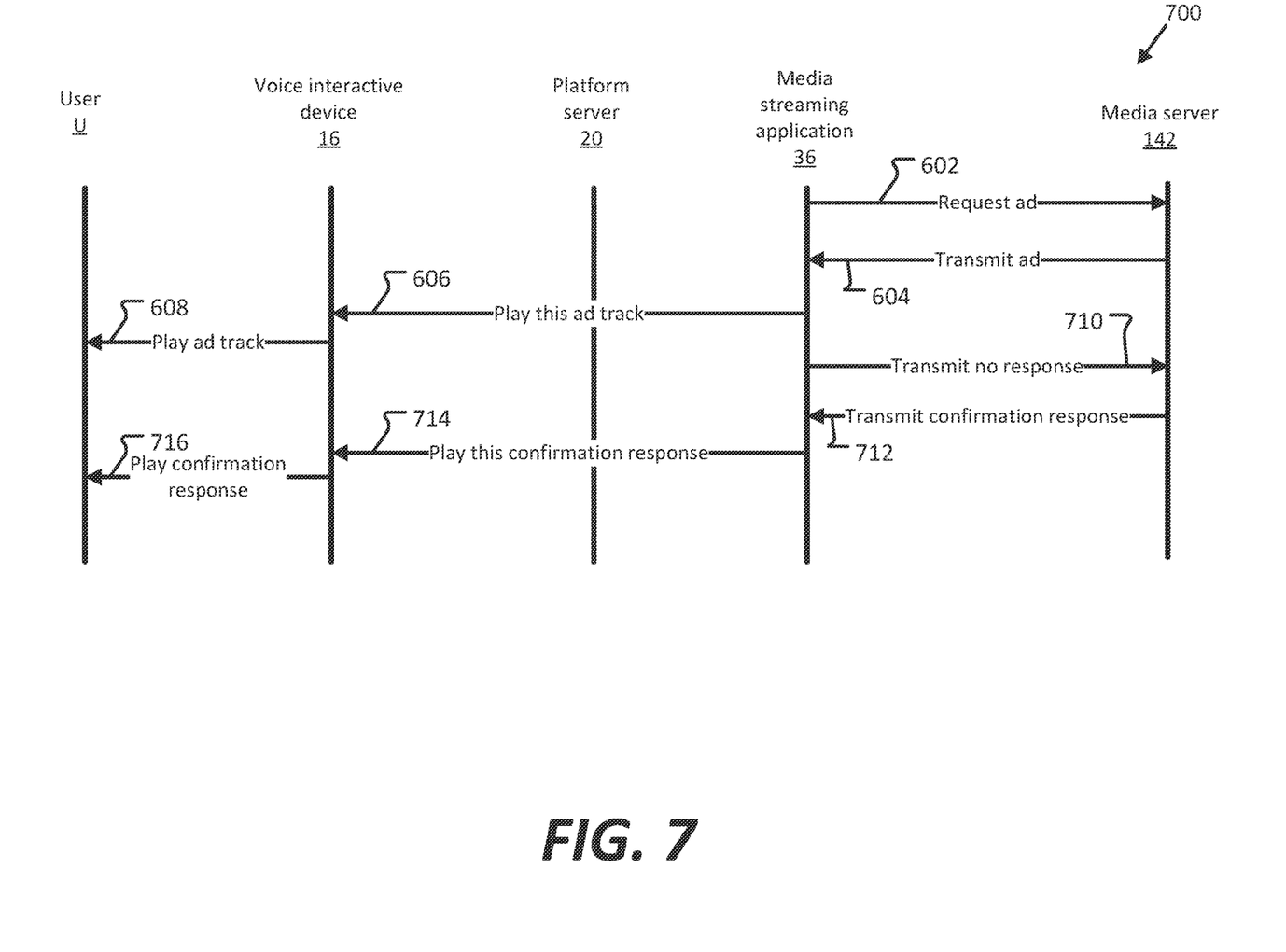
FIG. 7 is a messaging schematic where a user does not indicate interest in an advertisement.

FIG. 7 is a messaging schematic 700 where a user does not indicate interest in an advertisement. FIG. 7 includes example transmissions similar to FIG. 6, and in the same or similar environment. Transmissions 602, 604, 606, and 608 shown in FIG. 7 are described above with reference to FIG. 6.

In messaging schematic 700, the ad plays 608 for user U, but voice interactive device 16 does not receive an intent from user U during advertising audio playback. At some point after advertising audio playback, media-streaming application 36 sends a message 710 to media server 142 indicating no intent/user response was received.

Next, media server 142 transmits a confirmation response 712 message to media streaming application 36. Generally, a confirmation response is an audio confirmation that the user declined or ignored the advertisement. An example confirmation response sent in transmission 712 is "We guess now is not the right time for a free taco. Hope to see you at one of our locations soon."

In turn, media-streaming application 36 requests playback of the confirmation response 714 by voice interactive device. Then voice interactive device 16 plays the confirmation response 716, typically before the next audio file in the queue is played. After voice interactive device 16 plays the confirmation response 714, music or other non-advertising audio playback then typically resumes.

Embodiments can be implemented using one or more conventional general purpose or specialized digital computers, computing devices, machines, or microprocessors, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A method for determining advertising interaction with an electronic device, the method comprising:
providing, to the electronic device for output to a user, an advertising audio file that includes advertising content and a prompt for the user to speak to interact with the advertising content, wherein the prompt includes an intent defined by the electronic device as relating to audio file playback functionality;
receiving, from the electronic device, user input received by the electronic device, wherein the user input includes the intent, and wherein the user input is received from the electronic device in accordance with the intent being defined by the electronic device as relating to the audio file playback functionality;
determining the user input that includes the intent was received by the electronic device during playback of the advertising audio file;
in response to the determination, processing, by a media application, the intent as relating to advertising interaction functionality rather than the audio file playback functionality to determine a response to the user input that is related to the advertising audio file; and
providing a result that includes the response to one or more of the electronic device, another device associated with the user, or an account associated with the user for output to the user.

2. The method of claim 1, further comprising providing one or more non-advertising audio files in addition to the advertising audio file to the electronic device for output to the user.

3. The method of claim 2, further comprising:
receiving, from the electronic device, another user input received by the electronic device that includes the intent;
determining the other user input that includes the intent was received by the electronic device during playback of one of the one or more non-advertising audio files;
in response to the determination, processing the intent as relating to the audio file playback functionality to determine an audio content action corresponding to the intent; and
causing the audio content action to occur at the electronic device.

4. The method of claim 2, wherein the advertising audio file is not discernable from the one or more non-advertising audio files.

5. The method of claim 1, wherein determining the user input that includes the intent was received by the electronic device during playback of the advertising audio file comprises at least one of:
- identifying that a time stamp associated with the receipt of the user input corresponds with a position of the advertising audio file in an audio file queue for playback by the electronic device; and
- identifying metadata that indicates the advertising content of the advertising audio file was being played back by the electronic device when the user input was received.

6. The method of claim 1, wherein the result includes one or more of: additional information, a link to additional information, a coupon, or targeted advertising content related to the advertising audio file.

7. The method of claim 1, wherein the result further includes a confirmation, and providing the result comprises:
- providing the confirmation as a confirmation audio file to the electronic device for output to the user.

8. The method of claim 1, wherein providing the result comprises transmitting a message to the other device associated with the user.

9. The method of claim 1, wherein providing the result comprises sending an email to the account associated with the user.

10. The method of claim 1, wherein the intent defined by the electronic device as relating to the audio file playback functionality includes one or more of: play, skip, pause, stop, shuffle, repeat, or a phrase "I like this".

11. The method claim 1, wherein the intent defined by the electronic device only relates to the audio file playback functionality.

12. A computing device for determining advertising interaction with an electronic device, the computing device comprising:
- a processing unit; and
- memory storing instructions that, when executed by the processing unit, cause the computing device to:
  - provide, to the electronic device for output to a user, an advertising audio file that includes advertising content and a prompt for the user to speak to interact with the advertising content, wherein the prompt includes an intent defined by the electronic device as relating to audio file playback functionality;
  - receive, from the electronic device, user input received by the electronic device, wherein the user input includes the intent, and wherein the user input is received from the electronic device in accordance with the intent being defined by the electronic device as relating to the audio file playback functionality;
  - determine the user input that includes the intent was received by the electronic device during playback of the advertising audio file;
  - in response to the determination, process, by a media application, the intent as relating to advertising interaction functionality rather than the audio file playback functionality to determine a response to the user input that is related to the advertising audio file; and
  - provide a result that includes the response to one or more of the electronic device, another device associated with the user, or an account associated with the user for output to the user.

13. The computing device of claim 12, wherein the computing device is further caused to provide one or more non-advertising audio files in addition to the advertising audio file to the electronic device for output to the user.

14. The computing device of claim 13, wherein the computing device is further caused to:
- receive, from the electronic device, another user input received by the electronic device that includes the intent;
- determine the other user input that includes the intent was received by the electronic device during playback of one of the one or more non-advertising audio files;
- in response to the determination, process the intent as relating to the audio file playback functionality to determine an audio content action corresponding to the intent; and
- cause the audio content action to occur at the electronic device.

15. The computing device of claim 13, wherein the advertising audio file is not discernable from the one or more non-advertising audio files.

16. The computing device of claim 12, wherein, to determine the user input that includes the intent was received by the electronic device during playback of the advertising audio file, the processing unit is caused to one or more of:
- identify that a time stamp associated with the receipt of the user input corresponds with a position of the advertising audio file in an audio file queue for playback by the electronic device; or
- identify metadata that indicates the advertising content of the advertising audio file was being played back by the electronic device when the user input was received.

17. The computing device of claim 12, wherein the computing device is further caused to receive a request for the advertising audio file from an application executing on the electronic device, and the advertising audio file is provided to the electronic device in response to the request.

18. A method for determining advertising interaction with an electronic device, the method comprising:
- providing, to the electronic device for output to a user, an advertising audio file and a non-advertising audio file, wherein the advertising audio file includes advertising content and a prompt for the user to speak to interact with the advertising content, the prompt including an intent defined by the electronic device as relating to audio file playback functionality;
- receiving, from the electronic device, user input received by the electronic device, wherein the user input includes the intent and wherein the user input is received from the electronic device in accordance with the intent being defined by the electronic device as relating to the audio file playback functionality;
- determining whether the user input that includes the intent was received by the electronic device during playback of the advertising audio file or the non-advertising audio file;
- in response to a determination the user input that includes the intent was received by the electronic device during playback of the non-advertising audio file:
  - processing the intent as relating to the audio file playback functionality to determine an audio content action corresponding to the intent; and
  - causing the audio content action to occur at the electronic device; and
- in response to a determination that the user input that includes the intent was received by the electronic device during playback of the advertising audio file:

processing, by a media application, the intent as relating to advertising interaction functionality rather than the audio file playback functionality to determine a response to the user input that is related to the advertising audio file; and providing a result that includes the response to one or more of the electronic device, another device associated with the user, or an account associated with the user for output to the user.

19. The method of claim 18, wherein determining whether the user input that includes the intent was received by the electronic device during playback of the advertising audio file or the non-advertising audio file comprises:

identifying a time stamp associated with the receipt of the user input; and determining whether the time stamp corresponds with a position of the advertising audio file or the non-advertising audio file in an audio file queue for playback by the electronic device.

20. The method of claim 18, wherein determining whether the user input that includes the intent was received by the electronic device during playback of the advertising audio file or the non-advertising audio file comprises identifying metadata that indicates whether the advertising content of the advertising audio file or media content of the non-advertising audio file was being played back by the electronic device when the user input was received.

\* \* \* \* \*